(12) United States Patent
Tuncer (10) Patent No.: US 11,573,203 B2
(45) Date of Patent: Feb. 7, 2023

(54) HUMIDITY SENSOR

(71) Applicant: Texas Instruments Incorporated, Dallas, TX (US)

(72) Inventor: Enis Tuncer, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 211 days.

(21) Appl. No.: 17/027,592

(22) Filed: Sep. 21, 2020

(65) Prior Publication Data

US 2022/0091067 A1 Mar. 24, 2022

(51) Int. Cl.
*G01N 27/70* (2006.01)
*G01K 7/00* (2006.01)

(52) U.S. Cl.
CPC .............. *G01N 27/70* (2013.01); *G01K 7/00* (2013.01)

(58) Field of Classification Search
CPC ................................. G01N 27/70; G01K 7/00
USPC .......................................................... 324/464
See application file for complete search history.

(56) References Cited

U.S. PATENT DOCUMENTS

| | | | | |
|---|---|---|---|---|
| 5,013,693 A * | 5/1991 | Guckel | ................ | G01L 9/0019 216/2 |
| 5,530,284 A * | 6/1996 | Bailey | ............... | H01L 23/49562 257/676 |
| 2010/0143848 A1* | 6/2010 | Jain | ........................ | B23K 26/40 430/311 |
| 2010/0147070 A1* | 6/2010 | Jun | ....................... | G01N 27/121 216/13 |
| 2013/0056703 A1* | 3/2013 | Elian | ....................... | H01L 24/49 977/734 |
| 2013/0168548 A1* | 7/2013 | Wang | ................... | G01N 33/497 250/288 |
| 2017/0247247 A1* | 8/2017 | Zhang | ................... | G01N 27/223 |
| 2020/0026253 A1* | 1/2020 | Fuhr | ..................... | H04L 63/123 |
| 2020/0116663 A1* | 4/2020 | Tuncer | ................... | H01L 24/11 |

FOREIGN PATENT DOCUMENTS

| | | |
|---|---|---|
| CN | 105552739 | 5/2016 |
| JP | 7128293 | 5/1995 |
| JP | 2011064509 | 3/2011 |
| RU | 2242752 | 12/2004 |
| RU | 2365908 | 8/2009 |
| WO | 2020070015 | 4/2020 |

OTHER PUBLICATIONS

PCT Search Report Intl App No. PCT/US 2021/050005 dated Dec. 9, 2021, 3 pages.
Maskell, B.R., "The Effect of Humidity on a Corona Discharge in Air", Technical Report 70106, Royal Aircraft Establishment, U.D.C. 533.276 : 621.3.015.532; Jun. 1970; retrieved from URL http://www.dtic.mil/dtic/tr/fulltext/u2/720090.pdf on Sep. 21, 2020.

* cited by examiner

*Primary Examiner* — Christopher P McAndrew
(74) *Attorney, Agent, or Firm* — Dawn Jos; Frank D. Cimino (57) ABSTRACT

In a described example, an apparatus includes: at least one electrode having a base on a first surface of a substrate and extending away from the base to an end; a counter-electrode spaced from the end of the at least one electrode, having a first conductive surface facing the end; and a package having a cavity containing the at least one electrode, the substrate, and the counter-electrode, the package having at least one opening configured to allow an atmosphere to enter the cavity.

34 Claims, 6 Drawing Sheets

HUMIDITY SENSOR

TECHNICAL FIELD

This disclosure relates generally to sensors, such as sensors for relative humidity ("RH") measurements.

BACKGROUND

The level of humidity that is comfortable to humans is temperature dependent, and with the amount of water vapor the air can hold increasing with temperature, most humidity measurements made are of relative humidity, or RH. Relative humidity is a measure of the amount of water vapor in air at a given temperature. In many applications, relative humidity measurements are used to properly condition air for human comfort, or for another use, such as for drying, cooking, cooling, or to control an industrial process such as painting, printing, and drying of paints, inks, and curing liquid coatings. Heating, ventilation, and air conditioning ("HVAC") systems need to measure the relative humidity to improve or maintain human comfort in the controlled environment. Relative humidity is generally described as a percentage value, with 100% RH being the dew point or saturation level, and is measured at a given temperature, so that humidity sensors and relative humidity instruments need to measure temperature or to receive the temperature when the RH measurement is made.

Analog humidity gauges often rely on a "wet bulb" principle in which a wick is placed in a vessel with water in it, and the wick carries moisture to an absorbent material surrounding a thermometer gauge bulb. Air is flowed over the bulb and a "wet bulb" temperature is recorded. A dry thermometer bulb placed adjacent or proximal to the wet bulb is used and a contemporaneous dry bulb temperature is recorded. By determining the difference in temperature for the wet and dry bulb thermometer readings, a relative humidity can be determined indirectly, by using experimental observation charts for the instrument made in prior readings with known conditions. Note that this method measures temperature, and then indirectly infers the relative humidity based on the characteristics of absorbent material. The rate of absorption by the wick and the change in temperature of the wet bulb as compared to the dry bulb correspond to humidity, but the measurement is made by inferring the RH from prior results, and depends on a property of the wick material, absorption, that may vary over time, may vary with condition of the material, and which is only indirectly related to RH.

Packaged indirect sensing humidity sensors are available from Texas Instruments Incorporated. Example devices include the HDC2021, 2022, 2080, 2019, and the HDC1010 and 1080 integrated circuits. In these sensors, a polyimide material that has electrical characteristics that change as the material absorbs moisture is exposed to the atmosphere through an opening in a device package. The device package also contains a semiconductor device with a temperature sensor. An integrated circuit that includes an analog to digital converter ("ADC") can be connected to or integrated with the humidity and temperature sensors. The electrical characteristics of the polyimide material vary with the moisture absorbed, so a measurement can be made of conductivity or resistance of the sensor material after it is exposed to the atmosphere. The temperature is also sensed using the temperature sensor on the device, and using the two measurements, the relative humidity can be determined by using prior known experimental data for the device. Again, the measurement is made of a material characteristic that varies with humidity, and an inferred value for the relative humidity is then determined. The sensor relies on the electrical characteristics of a particular absorbent polyimide material, however, the characteristics of this material can change as it ages, and can vary with conditions or between devices. The material can also become oversaturated and prior exposure to moist atmospheres can affect the accuracy of the measurements, or even the availability of measurements. The operation of the device may need to be paused after exposure to a very high humidity environment while a heater dries the polyimide material, so that the material can again begin to absorb moisture. Hysteresis effects in the electrical characteristics can occur, that is, the conductivity measurements can be affected by prior cycles of absorption, saturation, desorption, and by age or other conditions of the material. The measurements may be less reliable than desired in certain conditions, and may become less reliable as the material ages. Delay between available measurements may occur. Recalibration or retraining of the device may be required.

SUMMARY

In a described example, an apparatus includes: at least one electrode having a base on a first surface of a substrate and extending away from the base to an end; a counter-electrode spaced from the end of the at least one electrode, having a first conductive surface facing the end; and a package having a cavity containing the at least one electrode, the substrate, and the counter-electrode, the package having at least one opening configured to allow an atmosphere to enter the cavity.

DETAILED DESCRIPTION

Corresponding numerals and symbols in the different figures generally refer to corresponding parts, unless otherwise indicated. The figures are not necessarily drawn to scale.

The term "cavity" is used herein. As used herein, a cavity is an empty space in a solid body. In the arrangements, a cavity is formed in a package. In the arrangements, a package has at least one opening to admit an atmosphere, such as air, into a cavity in the package.

The term "electrode" is used herein. As used herein, an electrode is a conductor for carrying voltage and current.

The term "counter-electrode" is used herein. As used herein, a counter-electrode is a conductor spaced from an electrode and configured to carry a reference voltage, such as ground. In the arrangements at least one electrode is positioned spaced from a counter-electrode and configured so that an ionization current can flow between the electrode and the counter electrode.

The term "corona discharge" is used herein. As used herein, a corona discharge occurs when a potential sufficient to cause ionization in the atmosphere is placed on an electrode, so that ionization current flows between the electrode and a counter-electrode spaced from the electrode by the atmosphere.

In this description, when the term "coupled" describes relationships between elements, "coupled" is not limited to "connected" or "directly connected," but may also include connections made with intervening elements, and additional elements and various connections may exist between any elements that are "coupled."

In the arrangements, the problem of providing a sensor that directly measures relative humidity is solved by placing an electrode or electrodes and a counter-electrode in an open cavity of a device package. The electrode(s) have an end spaced from a planar surface of the counter electrode in the cavity. The electrode and counter-electrode are exposed to the atmosphere. A voltage sufficient to cause current to flow from the electrode(s) to the counter-electrode by ionizing the atmosphere is applied (a corona discharge voltage, or "Vc.") At a given temperature and pressure, the Vc voltage needed for corona discharge to occur in the arrangements is dependent on the relative humidity. A measure of the temperature and of the corona discharge voltage Vc can then be used to determine the relative humidity RH. In an example arrangement, a solid state humidity sensor is formed using semiconductor device technology including an electrode assembly and a counter-electrode. In another arrangement, an integrated circuit is in a packaged device that includes an electrode assembly and a counter-electrode in a cavity, forming an RH sensor, a temperature sensor is integrated with the humidity sensor, and an analog-to-digital converter can be integrated into the same semiconductor device. In operation, the integrated RH sensor outputs digital signals corresponding to the relative humidity; or alternatively, outputs digital signals corresponding to voltage and temperature so that an external processor can determine the RH from these signals.

Methods for measuring the relative humidity include applying a voltage sufficient to cause an ionization current to flow between an electrode and a counter-electrode spaced from the electrode in a cavity exposed to the atmosphere, measuring the voltage and the temperature while the ionization current is flowing, and using stored data for the device, determining the relative humidity of the atmosphere. In the arrangements, empirical data measured for the apparatus can be used in a look-up table indexed by measured voltage, current and/or temperature. In another alternative, a curve fitting model can be determined using experimental empirical data for the apparatus, and the model can subsequently be used to determine RH from measurements. In contrast to the use of absorbent materials, the measurement in the humidity sensor of the arrangements is a direct measurement corresponding to humidity in the atmosphere, and is not affected by prior measurements, by age of the device, by prior cycles of absorption of materials, or by prior condition of the sensor. In contrast to the use of absorbent materials to measure humidity, accuracy of the measurement is consistent between readings even if the device is exposed to high humidity environments or to dry environments in prior measurement cycles.

Figure 1:
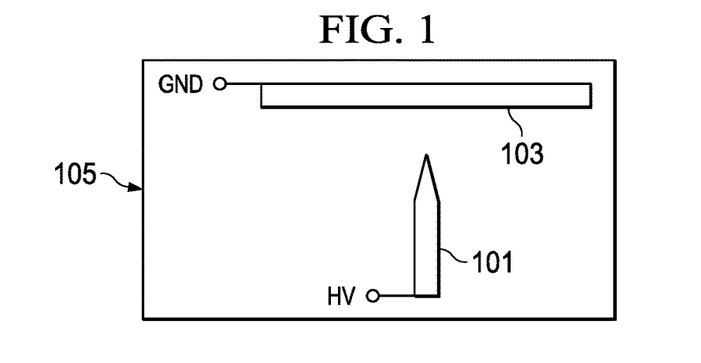
FIG. 1 is a block diagram of an electrode and counter-electrode.

FIG. 1 illustrates in a block diagram an experimental setup used to illustrate the operation of method arrangements. In FIG. 1, a pin such as a spring loaded or "pogo" probe pin 101 is in a chamber and spaced from a plate 103 that is grounded. A voltage supply "HV" is coupled to supply a high voltage to the probe pin. In experiments, the high voltage varied from about −3 kV to +3 kV. The chamber is filled with or exposed to the air.

Figure 2:
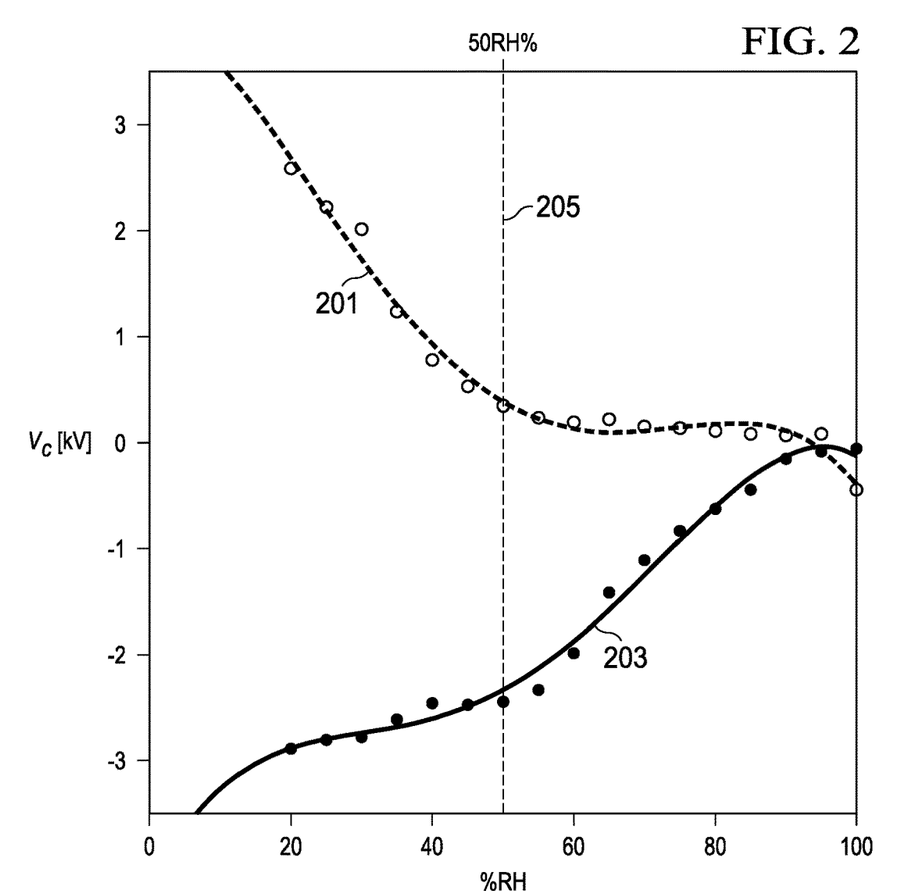
FIG. 2 is a plot of data points taken for relative humidity v. corona discharge voltage using an apparatus such as shown in FIG. 1.

FIG. 2 illustrates RH curves drawn using data points collected using the experimental setup shown in FIG. 1. At a temperature of 40 degrees Celsius, both a positive (see the upper curve labeled 201 in FIG. 2) and negative (see the lower curve labeled 203 in FIG. 2) high voltage were applied in a range from about +3 kV to about −3 kV to the probe pin. As is known to those skilled in the art, when an electric field of sufficient magnitude (in volts/meter (V/m) or volts/micron (V/μm)) is present, a gas such as air subjected to the electric field ionizes when the electric field is of sufficient magnitude for the gas. Further, when a voltage is coupled to a conductor, the electric field may be greater at sharp points, ends, or edges of the conductor. The electric field concentrates at or near sharp points or edges, lowering the corona discharge voltage Vc needed for the ionization of the air to occur. A visible corona discharge can take place when the air is ionized, the visible corona discharge in the proximity of the conductor is caused by photons that are emitted during ionization and these are often visible when the molecules in the gas proximate to the conductor become ionized so that electrons and protons separate, and either positive or negative ionization current can flow from the probe pin to the plate under these conditions.

A relationship between ionization current, voltage and the humidity in air are described in "The Effect of Humidity on a Corona Discharge in Air", B. R. Maskell, Technical Report No. 70106, Royal Aircraft Establishment (June 1970); available at the world wide web uniform resource locator (URL) address: http://www.dtic.mil/dtic/trl.fulltext/u2/7200090.pdf, which is hereby incorporated by reference in its entirety herein. FIG. 2 shows that for the experimental setup in FIG. 1, when the current was regulated to a 1 nanoampere current at a temperature of 40 degrees Celsius, the applied corona voltage Vc, that is the voltage where corona discharge occurs, is a decreasing function of moisture, so the corona discharge voltage Vc (the voltage where an ionization current of 1 nanoampere flows, the regulated current in the data plot of FIG. 2) falls as the relative humidity RH increases. As can be seen in FIG. 2, the relationships between the positive corona discharge voltage Vc (see curve 201), and RH, and the negative discharge voltage, −Vc, (see curve 203), and RH, are asymmetric. When the relative humidity RH is below about 50% (see line 205 in FIG. 2 marking 50% RH) the curve 201 for the positive corona discharge voltage is more or less linear, so that it provides a useful, direct and accurate measure of RH with relatively high sensitivity. As the RH increases above 50%, the positive polarity curve 201 becomes flattened and thus is less useful as a measurement (the voltage sensitivity to variations in RH becomes less), as the positive Vc voltage is no longer decreasing in a linear fashion with increasing RH. However, for the negative polarity voltage −Vc on the probe pin, shown as curve 203 in FIG. 2, the corona discharge voltage is linear when RH increases above 50%, but the curve is flattened when RH is lower than 50%. The corona discharge voltages varied from 0 to about +/−3 kilovolts (kV). When both positive and negative polarity Vc measurements are available, it was observed that a very accurate measure of RH can be made by measuring using the more linear polarity voltage for the measurement, with the selection made depending on the humidity. For example, by taking an initial RH reading, the voltage polarity used for a final measurement can be selected depending on whether the initial RH reading is greater than or less than 50%. As is further described below, example arrangements use a relative humidity sensor that ionizes air to cause a current to flow from an electrode during corona discharge, and also control circuitry that observes the corona discharge voltage to directly measure RH in the ambient atmosphere by applying these methods. In an alternative method, the voltage can be regulated to a desired level during a corona discharge and the current can be varied and measured to determine the RH.

Figure 3A:
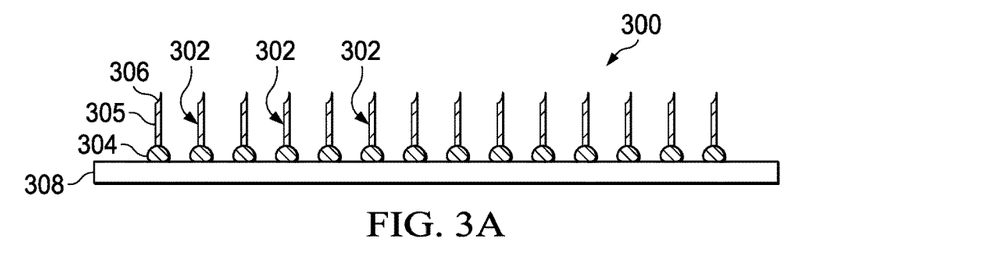
FIGS. 3A-3B are cross-sectional views of electrodes useful with the arrangements.

FIG. 3A is a cross-sectional view of an electrode assembly 300 for use with an arrangement. The example electrode array assembly 300 includes conductive electrodes 302 each having a base 304, a shaft 305 extending away from the base, and an end 306, the electrodes 302 are mounted on a first surface of a substrate 308. Because the electric field will be concentrated at sharp surfaces, the electrodes 302 can have ends 306 that are pointed as shown; however, in an alternative the ends can be flat or rounded, and the corona discharge voltage Vc might increase somewhat in those cases. In a useful arrangement, from 1-100 electrodes can be used, while in additional arrangements the number, size, and location of electrodes can be varied. The substrate 308 can be formed of a dielectric material, a conductive material, a semiconductor material, a film, a tape, a printed circuit board material such as fiber reinforced glass, ceramic, or alumina. The substrate 308 can include conductive traces, and can include multiple levels of conductive traces spaced by dielectric material, and/or conductive filled vias extending through the dielectric material to make vertical connections between levels of conductive traces. The conductive traces can be arranged to route conductive paths from the electrodes 302 to signals external to the substrate, such as high voltage signals, and can act as a redistribution layer ("RDL"). In an example, one or more terminals (not shown for clarity of illustration) for applying a positive or negative voltage is coupled by traces in the substrate 308 (also not shown for clarity of illustration) to the electrodes 302. In another alternative, an on-board voltage supply, such as a pulse width modulated ("PWM") switching power supply, can be included within the packaged device or formed on a semiconductor substrate with the RH sensor electrodes to generate the high voltage needed for the RH sensor.

As a further alternative, the substrate 308 can be a semiconductor device such as an integrated circuit including active devices, or can be a passive semiconductor device, and can include additional circuitry coupled to the electrodes. The circuitry can include components such as passive elements including capacitors, resistors, inductors, coils, and other elements including analog to digital converters ("ADCs"), voltage and current sources, multiplexers, logic circuitry, registers, memories, drivers, data buffers, and other analog or digital circuitry as is further described below. The electrodes 302 can be pins, needles, wires or probe pins. In an example arrangement, the electrodes 302 are formed as fine wires of diameter ranging between 0.5 mils and 2 mils with pointed ends. In an example the electrodes are formed using the capillary of a wire bonding tool to place a ball formed at an end of a bond wire end on a conductive land on the surface of the substrate 308, the ball forming the base portion 304, and the capillary of the wire bonder tool is then used to extend the bond wire from the base 304 to form the shaft 305 of a predetermined length of the electrode, and then the wire bonder tool is used to break the wire, forming a sharp point at the end 306 of the electrode(s) 302. In useful arrangements, the length of the shaft 305 varies from about 10-200 µms. The electrodes can be formed using "stud bumps" formed by a wire bonding tool. In stud bumping, the wire bonder capillary first forms a ball that is mechanically attached to a bond pad or conductive land to form the "bump" and then a portion of wire extending from the ball bond is formed as a "stud" extending from the "bump." Other electrodes can also be used. Other tools can be used to place electrodes on the substrate.

While a useful arrangements can be formed using as few as one conductive electrode, in the example arrangements described herein multiple electrodes 302 are used for increased accuracy, improved signal-to-noise-ratio ("SNR") and increased reliability. An arrangement with one electrode would have very low current during corona discharge, which can lower the SNR of a voltage or current measurement. Using more electrodes increases the current, and the magnitude of the signals being measured, increasing the SNR. Using a fine wire such as a bond wire for the electrode can lower the voltage Vc needed to initiate the corona discharge, as the electric field becomes concentrated around fine points and sharp edges when the high voltage is applied. In the arrangements, the conductive electrodes 302 may be formed from a bond wire of diameter in the range of 0.5 mils to 2 mils. These electrodes could be damaged by being dropped, or the wire bond electrodes could be bent or lost during subsequent processing. By having multiple conductive electrodes 302 connected in parallel electrically, the current increases during a measurement, and the change in a measurement due to the failure or breakage of one or more conductive electrodes 302 (or of an electrical connection to it) is easily averaged out when a voltage or current is measured. Further, using multiple conductive electrodes 302 makes the array of conductive electrodes easier and cheaper to manufacture, as manufacturing tolerances are eased and manufacturing errors are also overcome by averaging over a number of electrodes. The effect of differences between the conductive electrodes such as differences in length or diameter are canceled or are mitigated by simply averaging any measurements of current or voltage over several or many electrodes. In example arrangements, the number of electrodes varied between 1 and 100. More electrodes can be used to form additional arrangements.

Figure 3B:
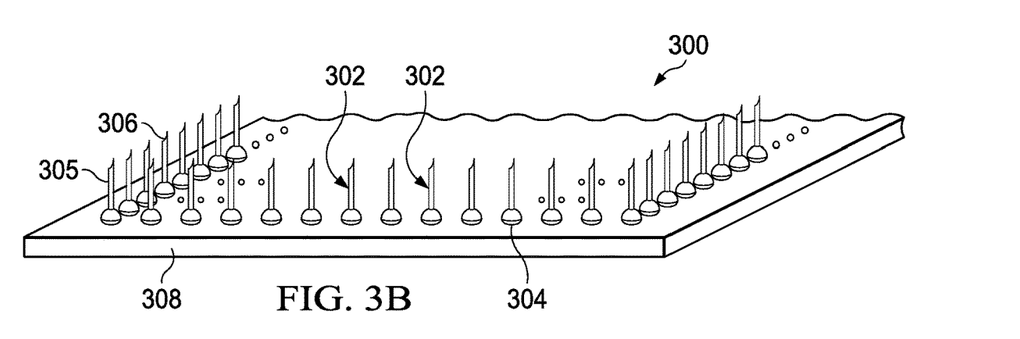

FIG. 3B shows an example arrangement where a two dimensional array of conductive electrodes 302 is formed on the substrate 308. Using an array of conductive electrodes can help eliminate any deviations caused by edge effects in manufacturing electrodes located at the edges of the array, including size or shape variations in the individual electrodes. The base portions 304 of electrodes 302 can be formed using ball bonds from a wire bonding tool as described above. The bond wire can be any bond wire used in semiconductor processing such as copper, gold, silver, aluminum, platinum, tungsten, titanium, platinum and alloys thereof. Copper bond wires for example, are useful. Coatings of gold, nickel, palladium and combinations can be used to reduce corrosion and mitigate ion diffusion, for example, these coatings can be applied when copper wire is used.

Figure 3C:
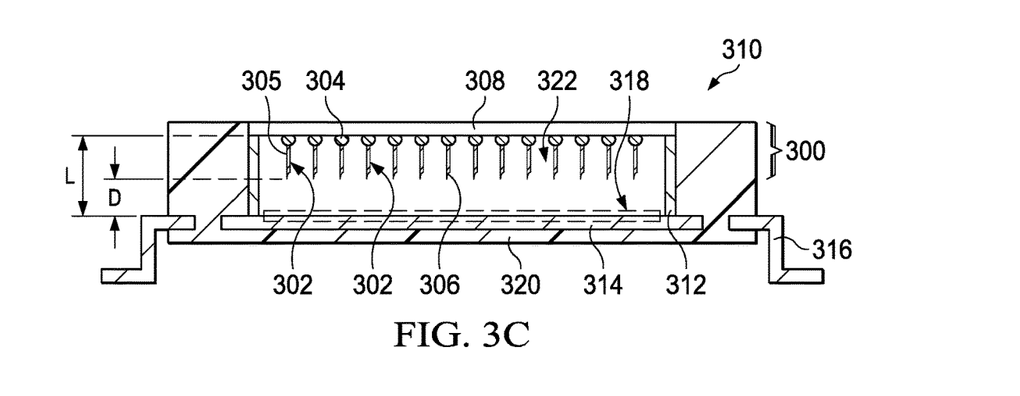
FIG. 3C illustrates an example arrangements using the electrodes.

FIG. 3C illustrates in a cross-sectional view an arrangement for a humidity sensor 310 formed as a packaged device. The electrode assembly 300 is mounted with the electrodes 302 extending from a top opening of the package into a cavity 322 within the packaged device, and the pointed ends of the electrodes 302 are facing a counter-electrode 318 formed on a substrate 314 or part of substrate 314. By leaving at least one end of the packaged electronic device 310 open, an open cavity 322 is formed so that the atmosphere (typically air) can enter the packaged sensor. In alternative examples, two ends of the cavity 322 can be left open. In yet another alternative example, an opening or openings (not shown in FIG. 3C) can be formed in the assembly 300 to allow the atmosphere, typically air, to enter the cavity 322. The distance "L" between the surface of assembly 300 and the counter-electrode 318 can vary. In example arrangements the distance L is between 100 and 1000 μms.

In the packaged device 310, spacing supports 312 are provided and are formed of a dielectric or insulator material, and provide mechanical support for the electrode assembly 300. The length "L" in FIG. 3C from top to bottom (as oriented in FIG. 3C) of the spacing supports 312 can be used to control the spacing distance "D" from the electrodes 302 on electrode assembly 300 to the counter-electrode 318. In an example the spacing distance "D" is about 10 microns, and can be varied to be greater than about 10 microns. In this example arrangement, a mold compound 320 is formed at least partially covering the substrate 314 and protecting the electrode assembly 300 and the substrate 314. Packaged device 310 is formed having leads 316 extending from at least two sides, for example the packaged device 310 may be a dual-in-line package ("DIP.") "Quad" packages with leads or terminals on four sides can be used. The counter-electrode 318 can be a separate conductive plate or can be a conductive surface formed on or mounted on the substrate 314, or in an alternative arrangement, can be a conductive portion of substrate 314. In some examples, the substrate 314 can be a portion of a lead frame. In other examples substrate 314 can be a metal plate, or can be another material plated with a metal to form the conductive counter-electrode 318. The metal can be formed of copper, gold, silver, nickel, aluminum, and alloys thereof. Electroplating and electroless plating can be used to form the conductive electrode 318. Platings that enhance solderability and bond wire adhesion and which reduce corrosion and prevent ion diffusion, such as gold, nickel, and palladium, or combinations of these, may be formed on the counter-electrode 318. The substrate 314 can be a semiconductor device, such as an integrated circuit, or can be a passive semiconductor device, and can include additional circuitry for use with the electrode assembly, as is further described below. Bond wires (not shown for clarity of illustration) can couple the substrate 314, or portions of it, to leads 316, to enable external connections to power supplies, data busses, clock inputs, and other signals needed to use the sensor 310 in a system or on a board.

In operation, a high voltage is applied to electrode assembly 300 relative to the counter-electrode 318, which may be at another reference voltage or which may simply be coupled to ground. The cavity 322 is open to the air and so contains air. In operation, when a voltage between the electrode assembly 300 and the counter electrode 318 reaches a sufficient corona discharge voltage Vc, the air ionizes, at least in the vicinity of the electrodes 302. Ionization current then flows between the electrode assembly 300 and the counter electrode 318, and the corona discharge voltage Vc can be measured while the ionization current flows. The corona voltage Vc measurement, along with a temperature measurement, can be used to determine the relative humidity RH. In an example, empirical data for the device is stored and can be retrieved using the measured corona discharge voltage Vc and a measured temperature. In an integrated arrangement a temperature sensor can be formed on or in the substrate 314, alternatively, a temperature sensor can be provided internal or external to the packaged sensor device 310. In an arrangement, the temperature sensor, along with ADC circuitry, is integrated on substrate 314 with the humidity sensor to form a packaged humidity sensor, with outputs providing digital signals corresponding to the measured relative humidity, or alternatively, with outputs corresponding to the temperature sensed and the voltage Vc sensed by the device, these values can be output to another processor device for use in determining RH.

In the arrangement of FIG. 3C, the electrode assembly 300 is positioned over a substrate 314 and faces a counter electrode 318 on or in the surface of that substrate, with the electrodes 302 extending downwards (as the device is oriented in FIG. 3C) into the cavity 322 in the packaged device 310. FIGS. 4A-4F illustrate, in a series of cross sectional views, selected steps in forming an alternative arrangement.

In the series of cross sections of FIGS. 4A-4F, an alternative arrangement has the electrodes of an electrode assembly 300 extending upwards from a substrate (as oriented in FIGS. 4A-4F), with the electrodes at the bottom of a cavity in a package (as oriented in FIGS. 4A-4F) and the pointed ends of the electrodes are spaced from and facing a counter-electrode, such as a lid, covering the cavity and facing downwards (again, as oriented in the figures).

Figure 4A:
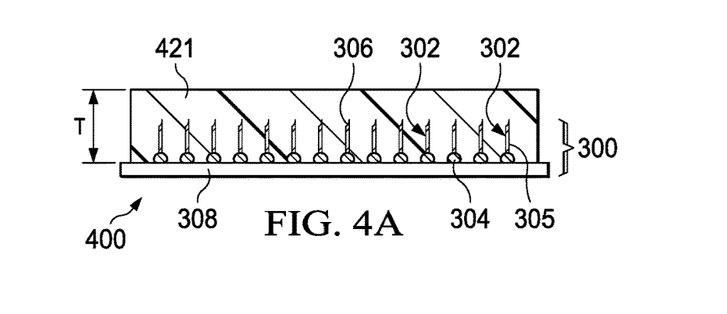
FIGS. 4A-4F are cross-sectional views illustrating a series of steps used to form an arrangement using electrodes similar to those in FIGS. 3A-3B, FIGS. 4G-4J illustrate views of additional arrangements.

FIG. 4A shows an initial stage of the assembly process of an arrangement 400 with substrate 308 and the plurality of electrodes 302 arranged spaced from one another, having pointed ends 306 extending away the substrate 308, the electrode assembly 300 (see FIG. 3A). A sacrificial material 421 is shown over assembly 300 and formed surrounding the electrodes 302 and covering the surface of the substrate 308, at least in part, and the sacrificial layer 421 can be patterned to form a rectangular or square shape. The sacrificial material 421 will be removed in a later process and can be a removable material that is: soluble in a solvent, soluble by water, removable by flushing or dissolution, by UV dissolution, by being dissolved by laser, a material removable by melting at an elevated temperature, or a material removable by pyrolizing. Useful example sacrificial materials include organic and inorganic materials including wax, epoxy, resin, and other materials that can form a solid at room temperature, and which can be removed by a subsequent process step. In the example arrangement 400, the sacrificial layer 421 is formed to a thickness "T" that corresponds to a distance between a conductive counter-electrode (added later and shown in FIGS. 4C-4F) and the electrode assembly 300. By varying the thickness "T", the distance between the pointed ends of the electrodes 302 and a conductive counter-electrode plate (not shown in FIG. 4A, but added later) can be controlled. In an example process, the sacrificial material is removed by pyrolizing it. Useful sacrificial materials for pyrolizing include high temperature thermoplastics such as polyetherimide, polyphenolsulfone, and polyethylene terephthalate. The sacrificial material can be any material that provides support for the electrodes and protects the electrodes during encapsulation and other processes, and which is removable by a subsequent removal process. Removal processes can include dissolution of the sacrificial material in a solvent, pyrolizing as described above, laser decapping, or plasma decapping processes.

Figure 4B:
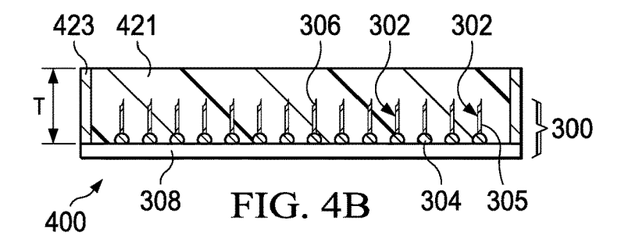

FIG. 4B illustrates in a cross sectional view the assembly 200 in FIG. 4A after additional processing. In FIG. 4B, the substrate 308 is again shown with the sacrificial material 421 protecting the electrodes 302, and with supports 423 formed adjacent the sacrificial material and outside the row of electrodes 302. The supports can be columns, posts, pillars, tubes or other shapes that will provide mechanical support and that defines the spacing distance for assembling the counter electrode over the plurality of electrodes 302.

Figure 4C:
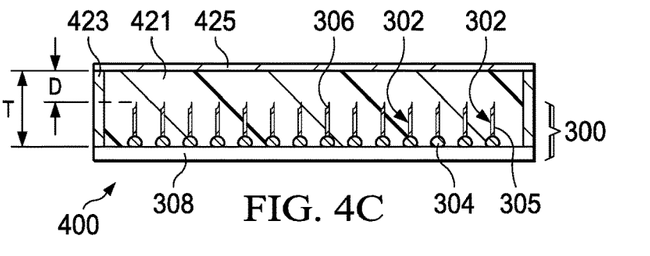

FIG. 4C illustrates in a cross sectional view the assembly 400 in FIG. 4B after a counter-electrode 425 is mounted over the electrodes 302 and the sacrificial layer 421 and on the supports 423. The distance D from the ends 306 of the electrodes 302 to the counter electrode 425 is defined by the distance "T", the length of the supports 423 and the thickness of the sacrificial layer 421. The counter-electrode 425 is a conductive plate spaced from the electrodes 302, and can be a solid conductive metal, such as gold, aluminum, copper, silver, or alloys of these. In alternative arrangements, the counter-electrode 425 can include a plated portion formed over a dielectric material, to form a conductive plate facing the electrodes 302 on a dielectric base. Examples include ceramic, plastic, films, or tapes that can carry a counter-electrode plate. The counter electrode 425 can be coupled to a terminal by a bond wire or by a through-via, as will be further described below, and may be placed at a ground or at another reference potential, and may be placed at a negative or positive potential with respect to the voltage of electrodes 302.

Figure 4D:
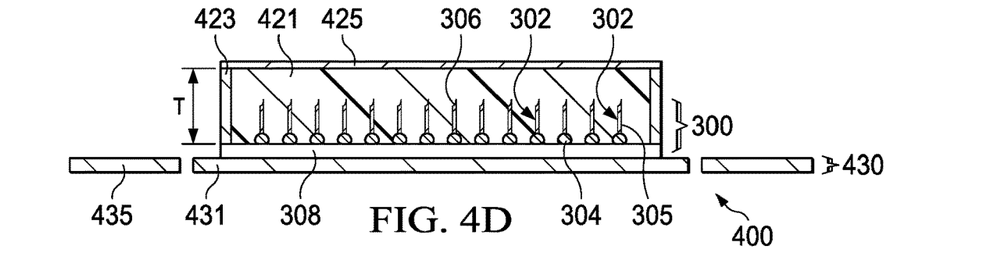

FIG. 4D is a cross sectional view of the arrangement 400 after an additional process step. In FIG. 4D, the substrate 308 along with the electrodes 302, sacrificial material 421. Supports 423, and counter-electrode 425 are placed on a die pad or die support area 431 of a lead frame 430. The lead frame includes the die pad portion 431 and leads 435. The leads 435 can be coupled to the substrate 308 using, for example, bond wires, or ribbon bonds, which are not shown for clarity of illustration. The leads 435 can be used to form a no-lead packaged device, or to form a leaded packaged device, as is further described below.

Figure 4E:
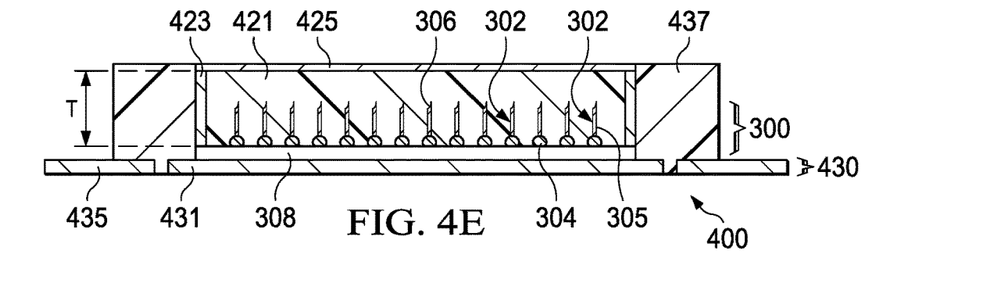

FIG. 4E is a cross sectional view of the arrangement 400 from FIG. 4D after an encapsulation or molding step. In FIG. 4E, mold compound 437 forms a protective package body and covers a portion of the lead frame 430, including a portion of the die pad 431 and leads 435, and the sides of supports 423 and a portion of substrate 308, surrounding the electrode assembly 300. At least one end, or in another alternative, two ends of the molded package are left open, so that sacrificial material 421 can be removed in a subsequent process step. Note that the leads 435 can be trimmed to be flush with the mold compound 437 in a no-lead or leadless package, such as a QFN package, or the leads can be left extending away from the mold compound 437 and shaped to form a leaded package, as is further described below. The die pad 431 can have a bottom portion (as arrangement 400 is oriented in FIGS. 4A-4F) covered by the mold compound 437. In an alternative arrangement, the bottom can be exposed from the mold compound 437 to form a thermal path, as shown in FIG. 4E. Similarly, the top surface of counter-electrode 425 can be exposed from the mold compound 437, as shown in the FIGS. 4E-4F, or can be covered in the encapsulation step. Mold compound 437 can be a thermoset epoxy resin, and can include hardeners, fillers, thermally conductive fillers, mold release compounds and other compositions used in encapsulation in the semiconductor industry.

Figure 4F:
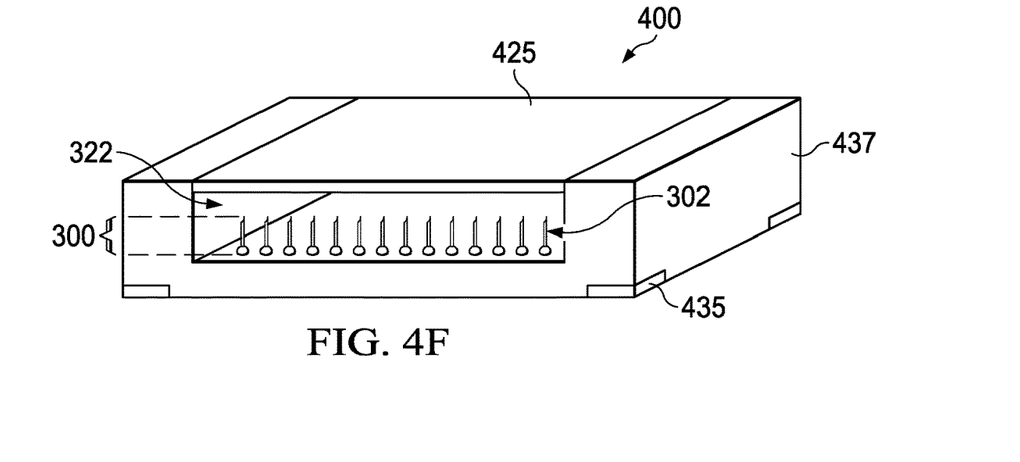

FIG. 4F shows in a projection view the example arrangement 400 after an additional process step of removing the sacrificial material (421 in FIG. 4E), exposing the electrode assembly 300 to the atmosphere in cavity 322. In the example of FIG. 4F the arrangement 400 is shown in a quad flat no lead ("QFN") package with leads 435 having ends coextensive with the surfaces of the mold compound 437 of the package. The counter-electrode 425 is shown as a plate exposed from the mold compound 437 at the top surface (as the arrangement 400 is oriented in FIG. 4F) of the packaged device 400. Leads 435 are arranged to be surface mounted to a board (not shown) and can be mounted using flux, solder, solder thermal reflow, and pick and place tools or other automated or manual board assembly tools.

Figure 4G:
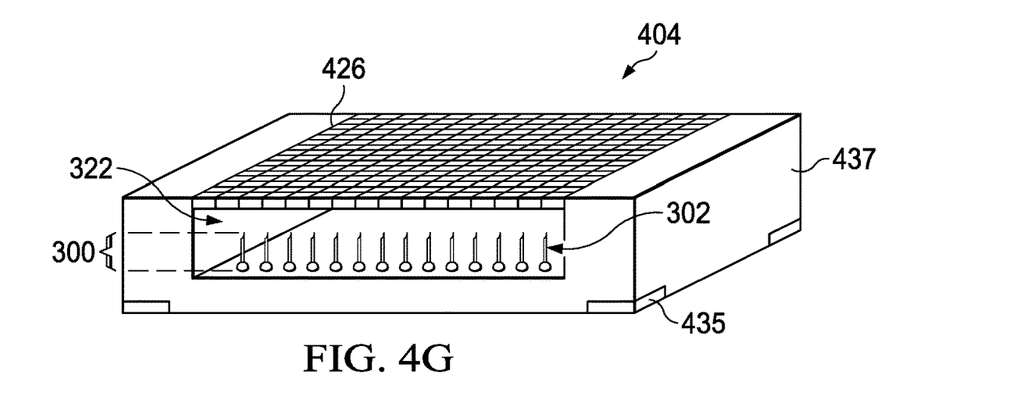

FIG. 4G is a projection view of an alternative arrangement 404 where the counter-electrode 426 includes a mesh of conductors with openings to the air. In one method for forming the arrangement 404, the counter-electrode mesh 426 is formed by placing conductors in a matrix with a sacrificial material that is removed after the mesh is mounted to the mold compound 437. The counter-electrode mesh covers cavity 322 that contains the electrode assembly 300. The sacrificial material can be removed at the same time as the sacrificial material 421 that protects the electrodes, for example by pyrolizing the sacrificial material, alternatively the sacrificial material in mesh 426 can be removed in a separate process such as by applying a solvent. In another alternative (not shown) the counter-electrode 426 can include a dielectric support material that carries the mesh of electrodes and which is not removed. The cavity 322 is open to the air so that the electrodes 302 and the counter-electrode mesh 426 have air between them.

FIG. 4H illustrates in an additional projection view an example where an opening 427 is made in the counter-electrode 426 to admit air to the cavity 322. One or two sides of the package 437 may be open to the cavity 322 or can be closed since the top of the cavity is now open to the atmosphere at least in a central portion.

Figure 4I:
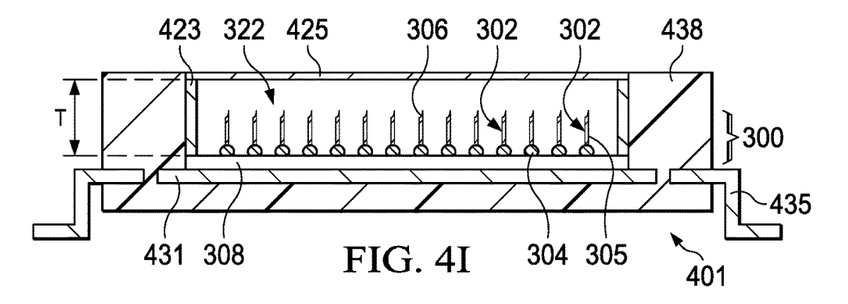

FIG. 4I illustrates in another cross sectional view an alternative arrangement 401 that is packaged in a dual in-line package ("DIP") with leads 435 formed by bending and trimming after the molding step. The leads 435 are shaped to extend from mold compound 438. The leads 435 are arranged for surface mounting to a board. Mold compound 438 covers the die pad portion of the lead frame 431 and surrounds the sides of supports 423, and a portion of substrate 308 of the electrode assembly 300. At least one end of the package is left open and sacrificial material 421 is removed after molding, exposing cavity 322 and electrodes 302 to the air.

Figure 4J:
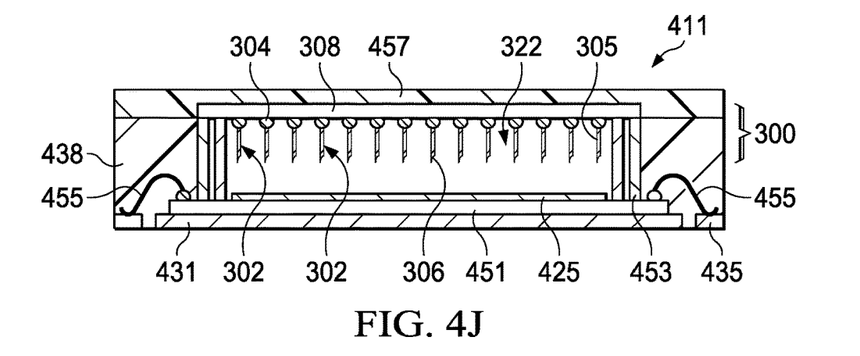

FIG. 4J illustrates in a cross sectional view an alternative arrangement 411. In the arrangement 411, the electrode assembly 300 is mounted over a cavity in a packaged device with the counter electrode 425 on a substrate 451 that is placed on the die pad 431 of the leadframe. In an example the substrate 451 is a semiconductor device, and the counter electrode 425 can be a plated portion on a semiconductor device. The semiconductor device of substrate 451 can include additional components. In one example the semiconductor device is an integrated circuit that can include a temperature sensor and an analog to digital converter. In an additional arrangement, the semiconductor device can be an integrated circuit that includes the temperature sensor, an ADC, and a controller to operate the RH sensor and the temperature sensor, and which can output a digital signal that corresponds to the measured relative humidity.

In the arrangement 411, through package vias or wires 453 form electrical connections between the electrode assembly 300, and more specifically substrate 308, and the semiconductor device 451. These connections can carry the high voltage signal to the electrode assembly, for example, during a corona discharge voltage or current measurement. Bond wires 455 couple the substrate 451 to leads 435. The bond wire connections can be formed using a wire bonding tool that typically puts a ball bond on the substrate 451 (on a bond pad, not shown for clarity) and extends the bond wire to a stitch bond on the lead 435, for example. Mold compound 438 is used to encapsulate the components to form a packaged device. As described above, a sacrificial layer (not shown in FIG. 4I) can be used to form a cavity in the package, the electrode assembly 300 can be mounted after the mold compound 438 is cured, with the electrodes 302 facing the counter-electrode 425. An additional protective layer 457 can be formed over the electrode assembly 300, and can include resin, epoxy, mold compound, adhesives, film or tape. In an example, the protective layer 457 can be a thermally conductive metal lid or heat sink. At least one end of the packaged device 411 is open so that cavity 322 is exposed to the air, and electrode assembly 300 and counter electrode 425 are exposed to the air. When a voltage sufficient to ionize the air is applied to the electrode 302, a corona discharge can occur between the electrodes 302 and the counter-electrode 425, and the relative humidity can be determined as described above.

Figure 5:
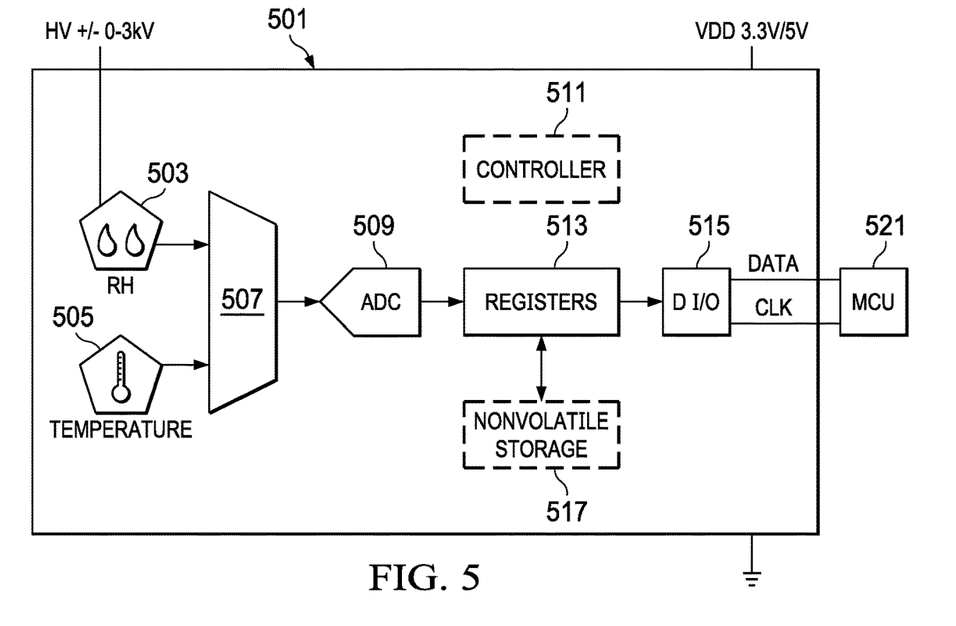
FIG. 5 is a block diagram illustrating a circuit for use with the arrangements.

FIG. 5 is a block diagram for an example circuit arrangement 501 using an RH sensor. In FIG. 5, the RH sensor 503 is a corona discharge RH sensor as described above. A multiplexer 507 can select an output of the RH sensor 503, or of the temperature sensor 505. The RH sensor 503 may output a signal corresponding to the voltage Vc where a corona discharge current flows between an electrode and a counter electrode exposed to the atmosphere, for example. The temperature sensor 505 can output a voltage corresponding to the temperature on a device. For example, a temperature sensor based on a proportional to absolute temperature ("PTAT") circuit device can be used. An analog-to-digital converter ("ADC") 509 receives the voltages from the sensor that is selected by multiplexer 507 and outputs digital values corresponding to the voltages, which can be stored in registers 513. A data input-output block ("D I/O") 515 transmits and receives data from an external bus. The D I/O block can receive a clock for use in synchronous data transmission. Controller 511 can be a state machine, microcontroller unit ("MCU"), or a programmable controller or embedded processor that controls the multiplexer 507, the registers 513, the data I/O block 515, and which can also retrieve data from a non-volatile storage 517. However, in an alternative arrangement, the controller 511 can be omitted (as indicated by the dashed outline for 511) and the circuit 501 can be controlled by an external device such as a microcontroller unit ("MCU") 521 that is coupled to read and write registers in registers 513 through the data I/O block 515. In an example the D I/O block 515 can be a serial interface such as an I2C interface block or an SPI interface block, alternatively a parallel data bus can be used. Useful example memory components for implementing the non-volatile storage 517 include a one-time programmable ("OTP") memory, such as read-only memory ("ROM"), a fuse array, an electrically programmable ROM ("EPROM"), an electrically erasable and programmable ROM ("EE-PROM" or "E2PROM"), a flash memory, or a battery backed up random access memory ("RAM"). The non-volatile storage 517 can be used as a look up table to provide RH measurements that correspond to the temperature and voltage Vc measurements obtained from the sensors 503, 505, so that the circuit 501 can be an integrated RH sensor that outputs RH values. Other parameters such as calibration values for the temperature sensor or the RH sensor can be stored and retrieved from the non-volatile storage 517. Program instructions for the controller 511 can be stored in the non-volatile memory. In a useful arrangement, the temperature sensor 505 can be integrated into a semiconductor device that includes circuit 501, or in an alternative useful arrangement, the temperature sensor can be an external temperature sensor device coupled to an integrated circuit to complete the circuit 501.

Figure 6:
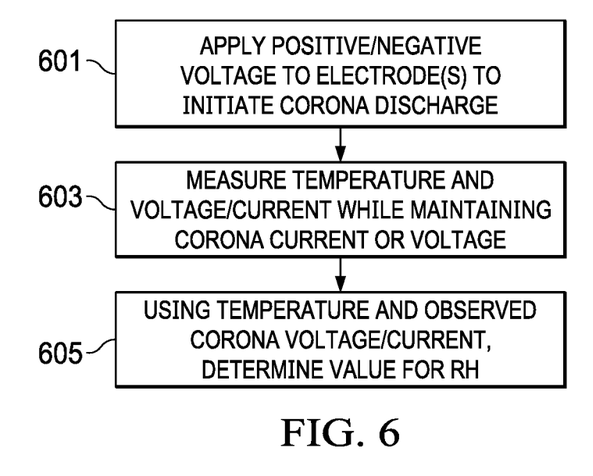
FIG. 6 is a flow diagram illustrating a method.

FIG. 6 is a flow diagram for an example method arrangement for measuring RH. In FIG. 6, at step 601, voltage is applied to an electrode in a cavity that is spaced from a counter-electrode, and exposed to the atmosphere, until an ionization current flows. The voltage can be negative or positive between the electrode and the counter-electrode. At step 603, measurements are taken while the current flows, for example temperature and electrode voltage measurements can be made. In another alternative, current and temperature measurements at a regulated voltage level can be made while the corona discharge current flows. At step 605, the measurements taken are used to determine a value for relative humidity, RH.

Figure 7:
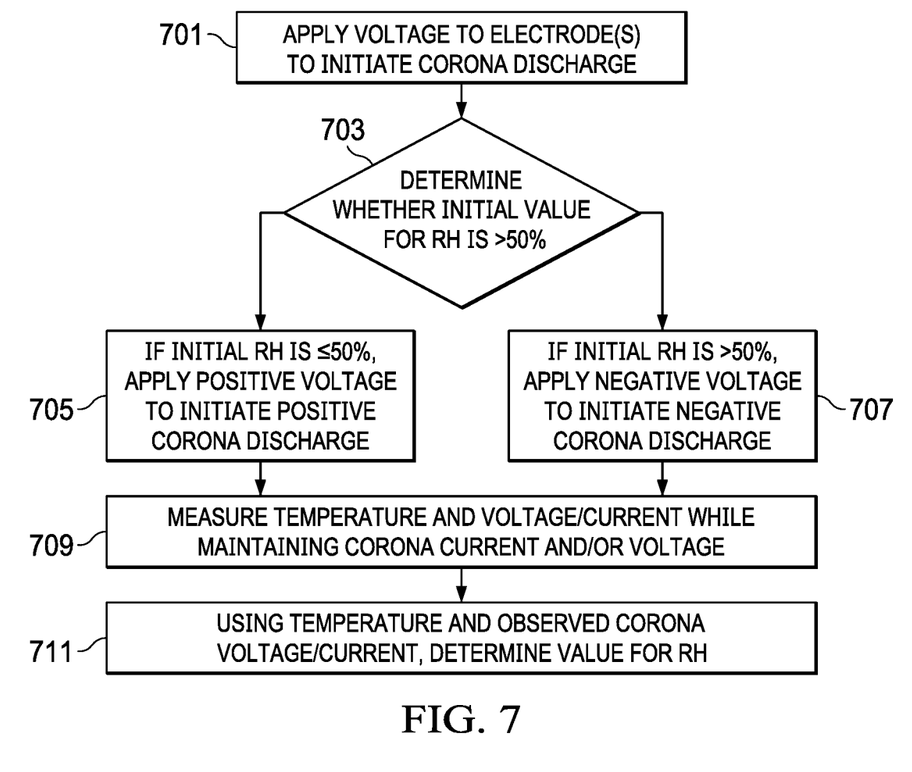
FIG. 7 is a flow diagram illustrating an alternative method.

FIG. 7 is another flow diagram for an alternative method using an RH sensor of the arrangements. In FIG. 7, at step 701, a voltage is applied to an electrode in a cavity exposed to the atmosphere, the voltage being sufficient to cause a corona discharge to occur, and current to flow to a counter-electrode spaced from the electrode. The voltage can be a positive polarity or a negative polarity with respect to the counter-electrode. At step 703, an initial RH measurement is determined using a temperature, and the voltage or current measured while the corona discharge current is flowing; and a decision is made. If, at step 703, the initial RH value is <=50%, the method continues by transitioning to step 705. If instead the initial RH value is greater than 50%, the method continues by transitioning to step 707.

At step 705, a positive voltage is applied to again initiate a corona discharge between the electrode assembly and the counter electrode, ionizing the atmosphere and causing current to flow. The method then transitions to step 709.

At step 707, when the initial RH is >50%, a negative voltage is applied to initiate a negative corona discharge current. The method then transitions to step 709.

At step 709, a measurement is made of temperature and the corona discharge voltage, or temperature and the current flowing. Because the voltage measurement is made using the linear part of the response curve by determining whether to apply a negative or positive voltage to the electrode assembly before the final measurement is made, the measurement is made using the voltage that is most sensitive to the level of humidity being measured.

At step 711, the measurements for temperature and voltage or current during the corona discharge are used to determine a value for RH. For example, a table of RH values at a given temperature that correspond to the measured voltage or current can be stored in a memory and accessed using the temperature and the measured voltage or current to address the entries.

Modifications are possible in the described arrangements, and other alternative arrangements are possible within the scope of the claims.

What is claimed is:
1. An apparatus, comprising:
   at least one electrode having a base on a first surface of a substrate and extending away from the base to an end of the at least one electrode;

a counter-electrode spaced from the end of the at least one electrode, having a first conductive surface facing the end; and a package having a cavity containing the at least one electrode, the substrate, and the counter-electrode, the at least one electrode extending into the cavity in a vertical direction, the vertical direction being substantially perpendicular to a plane along a lengthwise surface of the apparatus.

2. The apparatus of claim 1, wherein the substrate further comprises a semiconductor device.

3. The apparatus of claim 2, wherein the semiconductor device further comprises active transistors formed in the semiconductor device.

4. The apparatus of claim 2, wherein the semiconductor device further comprises a programmable processor.

5. The apparatus of claim 1, wherein the substrate further comprises a printed circuit board.

6. The apparatus of claim 1, wherein the at least one electrode further comprises a row of electrodes.

7. The apparatus of claim 1, wherein the at least one electrode further comprises an array of electrodes arranged in rows and columns.

8. The apparatus of claim 1, wherein the package further comprises a mold compound and the cavity is a space within the mold compound, the cavity having a bottom surface, a first side, a second side opposite the first side, and an open top opposite the bottom surface, and the substrate is positioned at the bottom surface of the cavity, and the counter-electrode covers at least a portion of the open top of the cavity.

9. The apparatus of claim 1, wherein the counter-electrode is mounted to a die attach pad of a second substrate which further includes conductive leads.

10. The apparatus of claim 1, wherein the package further comprises a mold compound, the cavity comprising an opening in the mold compound having a bottom surface, a first side extending from and perpendicular to the bottom surface, a second side extending from the bottom surface and opposite the first side, a third side that is open, and a fourth side opposite the third side that is open, and an opening at a top of the cavity opposing the bottom surface of the cavity, the counter-electrode is placed at the bottom surface of the cavity, the substrate is mounted to the package to cover the opening at the top of the cavity and positioned facing the counter-electrode so that the at least one electrode extends into the cavity and the end of the at least one electrode is spaced from and facing the counter-electrode.

11. The apparatus of claim 10, wherein the package further comprises conductive vertical vias extending through the mold compound electrically coupling the substrate to the counter-electrode.

12. The apparatus of claim 1, wherein the at least one electrode and the counter-electrode are configured to conduct ionization current between them when a voltage sufficient to cause a corona discharge is applied between the at least one electrode and the counter-electrode.

13. The apparatus of claim 1, wherein the at least one electrode comprises bond wire having a diameter in a range from 0.5 mils to 2 mils.

14. The apparatus of claim 13, wherein the end of the at least one electrode has a pointed shape.

15. The apparatus of claim 14, wherein the pointed shape is formed using a wire bonding tool.

16. The apparatus of claim 1, wherein the at least one electrode is formed of a metal.

17. The apparatus of claim 16, wherein the at least one electrode is formed of one of gold, silver, palladium, copper, aluminum, titanium, tungsten, platinum and alloys thereof.

18. The apparatus of claim 16, wherein the at least one electrode is copper bonding wire that further comprises a plating that includes at least one of: silver, gold, palladium, nickel, or combinations or alloys of these.

19. A packaged sensor device, comprising:
a humidity sensor configured to form a corona discharge, comprising:
at least one electrode configured to conduct a voltage greater than one kilovolt, the electrode having a base on a first surface of a substrate and having a shaft extending from the base to an end;
a counter-electrode spaced from the end of the at least one electrode, having a first planar conductive surface facing the end;
a package containing the at least one electrode, the substrate, and the counter-electrode in a cavity within the package, the cavity having at least one opening that allows an atmosphere to enter the cavity;
an analog-to-digital converter (ADC) coupled to the humidity sensor and configured to receive a voltage of the at least one electrode while an ionization current flows between the at least one electrode and the counter-electrode;
a data input/output circuit coupled to a digital output of the ADC and configured to output digital signals and to input digital signals at a data terminal; and
a controller configured to couple the humidity sensor to a voltage supply sufficient to cause an ionization current to flow between the at least one electrode and the counter-electrode, the controller further configured to control the ADC to sample the voltage at the at least one electrode while the ionization current flows, and the controller configured to cause the data input/output circuit to output digital signals corresponding to the sampled voltage.

20. The packaged sensor device of claim 19, wherein the substrate is an integrated circuit and the ADC, data input/output circuit, and controller are in the integrated circuit.

21. The packaged sensor device of claim 20, and further comprising a temperature sensor in the integrated circuit, the temperature sensor configured to output a voltage to the ADC that corresponds to temperature of the substrate.

22. A method, comprising:
applying a voltage sufficient to cause an ionization current to flow between at least one electrode spaced from a counter-electrode in a cavity of a packaged device that is filled with air;
measuring the voltage at the at least one electrode while ionization current flows between the at least one electrode and the counter-electrode; and
using the measured voltage, determining a relative humidity of the air in the cavity.

23. The method of claim 22, wherein measuring the voltage further comprises:
using the measured voltage and a temperature measurement, making an initial determination of a relative humidity of air in the cavity;
when the relative humidity of the air is initially determined to be less than or equal to 50%, applying a positive voltage sufficient to cause an ionization current to flow from the at least one electrode to the counter electrode in the cavity, measuring the positive voltage while the ionization current flows, and using a temperature measurement and the measured positive voltage, making a final determination of the relative humidity of the air in the cavity;

when the relative humidity of the air is initially determined to be greater than 50%, applying a negative voltage to the at least one electrode that is sufficient to cause ionization current to flow from the counter-electrode to the electrode, measuring the negative voltage while the ionization current flows, and measuring the temperature, and using the measured negative voltage and the measured temperature, determining the relative humidity of the air in the cavity.

24. A method, comprising:
forming at least one electrode on a first substrate, the at least one electrode having a base on the first substrate, and a shaft extending from the base to an end;
forming a sacrificial layer over at least a portion of the first substrate and the at least one electrode to form an electrode assembly, the sacrificial layer having a first side, a second side opposing the first side, a third side that is perpendicular to the first side, and a fourth side opposing the third side and perpendicular to the first side;
mounting the electrode assembly on a second substrate;
covering the electrode assembly with the sacrificial layer and a least a portion of the second substrate with a mold compound, the mold compound covering the first and second sides of the sacrificial layer and exposing the third and fourth sides of the sacrificial layer;
mounting a counter-electrode over a top surface of the sacrificial layer; and
removing the sacrificial layer to expose the at least one electrode and a surface of the counter-electrode to air, forming a cavity in a package formed by the mold compound such that the at least one electrode extends into the cavity in a vertical direction, the vertical direction being substantially perpendicular to a plane along a lengthwise surface of the second substrate, the cavity being open to the air.

25. The method of claim 24, wherein the first substrate is an integrated circuit.

26. The method of claim 24, wherein the second substrate is a lead frame.

27. The method of claim 26, wherein the package is a leaded package.

28. The method of claim 26, wherein the package is a no-lead package.

29. The method of claim 24, wherein the end of the at least one electrode is spaced from a surface of the counter-electrode by a distance of at least 10 microns.

30. The method of claim 24, wherein the counter-electrode is one of a solid conductive plate and a mesh of conductive material.

31. The method of claim 24, wherein the sacrificial layer is one of polyetherimide, polyphenolsulfone, and polyethylene terephthalate.

32. The method of claim 31, wherein the sacrificial layer is removed by pyrolizing it.

33. The apparatus of claim 1, wherein the package includes at least one opening configured to allow an atmosphere to enter the cavity.

34. A semiconductor package comprising:
a set of bond wires, each of the set of bond wires including a base on a first surface of a substrate and extending away from the base to an end of the set of bond wires;
a counter-electrode spaced from the end of the set of bond wires, having a first conductive surface facing the end; and
a mold compound having a cavity containing the at least one electrode, the substrate, and the counter-electrode, the set of bond wires extending into the cavity in a vertical direction, the vertical direction being substantially perpendicular to a plane along a lengthwise surface of the semiconductor package.

* * * * *